United States Patent
Amagasaki et al.

(10) Patent No.: US 9,964,015 B2
(45) Date of Patent: May 8, 2018

(54) BREATHER PIPE STRUCTURE FOR LIQUID REDUCING AGENT STORAGE TANK

(75) Inventors: Shin Amagasaki, Fujisawa (JP); Takuya Mito, Fujisawa (JP); Tatsuo Mashiko, Fujisawa (JP); Kazuhiro Kodaira, Fujisawa (JP); Akihiro Tozuka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 248 days.

(21) Appl. No.: 13/580,774

(22) PCT Filed: Feb. 23, 2011

(86) PCT No.: PCT/JP2011/053983
§ 371 (c)(1),
(2), (4) Date: Aug. 23, 2012

(87) PCT Pub. No.: WO2011/105427
PCT Pub. Date: Sep. 1, 2011

(65) Prior Publication Data
US 2012/0318813 A1    Dec. 20, 2012

(30) Foreign Application Priority Data
Feb. 26, 2010    (JP) .................................. 2010-042744

(51) Int. Cl.
*B65D 90/34* (2006.01)
*F01N 3/20* (2006.01)

(52) U.S. Cl.
CPC ........ *F01N 3/2066* (2013.01); *F01N 2610/10* (2013.01); *F01N 2610/1406* (2013.01);
(Continued)

(58) Field of Classification Search
CPC ............ B01D 53/9495; B01D 53/9431; F01N 13/0093; F01N 3/2066
(Continued)

(56) References Cited

U.S. PATENT DOCUMENTS 3,500,843 A * 3/1970 White ............................ 137/43
4,722,454 A * 2/1988 Fischer ........................ 220/746
(Continued)

FOREIGN PATENT DOCUMENTS

EP    2006502 A2    12/2008
EP    2006503 A1    12/2008
(Continued)

OTHER PUBLICATIONS

PCT Search Report for PCT Serial No. PCT/JP2011/053983 dated May 13, 2011.
(Continued)

*Primary Examiner* — Anthony Stashick
*Assistant Examiner* — Kaushikkumar Desai
(74) *Attorney, Agent, or Firm* — McCormick, Paulding & Huber LLP

(57) ABSTRACT

Provided is a breather pipe structure for a liquid reducing agent storage tank which ensures that a liquid reducing agent can be supplied without trouble even if a breather pipe in the liquid reducing agent storage tank is clogged with frozen liquid reducing agent. In a breather pipe structure for a liquid reducing agent storage tank (10) which stores a liquid reducing agent (5) and which has a breather pipe (20) for introducing/discharging air attached on top of the liquid reducing agent storage tank (10), a lower end (20*c*) of the breather pipe (20) in the liquid reducing agent storage tank (10) is arranged to extend along a liquid reducing agent defrosting piping (16) provided in the liquid reducing agent storage tank (10).

4 Claims, 2 Drawing Sheets

(52) U.S. Cl.
CPC ............... *F01N 2610/1413* (2013.01); *F01N 2610/1466* (2013.01); *Y02T 10/24* (2013.01)

(58) Field of Classification Search
USPC .......... 220/745, 746, 86.2, DIG. 27; 60/286, 60/295
See application file for complete search history.

(56) References Cited

U.S. PATENT DOCUMENTS

| | | | | |
|---|---|---|---|---|
| 6,063,350 | A * | 5/2000 | Tarabulski | B01D 53/90 423/212 |
| 6,810,661 | B2 * | 11/2004 | Lambert | B01D 53/90 123/41.42 |
| 7,040,084 | B2 * | 5/2006 | Ament | 60/274 |
| 2002/0139438 | A1 * | 10/2002 | Lange | B67D 7/04 141/231 |
| 2003/0200743 | A1 * | 10/2003 | Berriman et al. | 60/286 |
| 2007/0068525 | A1 * | 3/2007 | Offenhuber | A62C 3/07 128/204.21 |
| 2007/0079599 | A1 * | 4/2007 | Osaku | F01N 3/2066 60/283 |
| 2009/0019840 | A1 * | 1/2009 | Osaku | F01N 3/2066 60/295 |
| 2009/0038296 | A1 * | 2/2009 | Fukuda et al. | 60/295 |
| 2009/0078692 | A1 * | 3/2009 | Starck | F01N 3/2066 219/260 |
| 2009/0100824 | A1 * | 4/2009 | Starck | B01D 53/9431 60/286 |
| 2010/0050606 | A1 * | 3/2010 | Fulks et al. | 60/286 |
| 2010/0154907 | A1 * | 6/2010 | Lecea | F01N 3/2066 137/565.29 |
| 2011/0209464 | A1 * | 9/2011 | Osaku | F01N 3/2066 60/295 |

FOREIGN PATENT DOCUMENTS

| | | |
|---|---|---|
| JP | 07-119556 | 5/1995 |
| JP | 2000-027627 | 1/2000 |
| JP | 2005-083223 | 3/2005 |
| JP | 2007-262900 | 10/2007 |
| JP | 2008-008238 | 1/2008 |
| JP | 2008008238 | 1/2008 |

OTHER PUBLICATIONS

Supplemental European Search Report attached for Corresponding European Application No. 11747387.6 dated Mar. 7, 2014.

* cited by examiner

【FIG. 1】
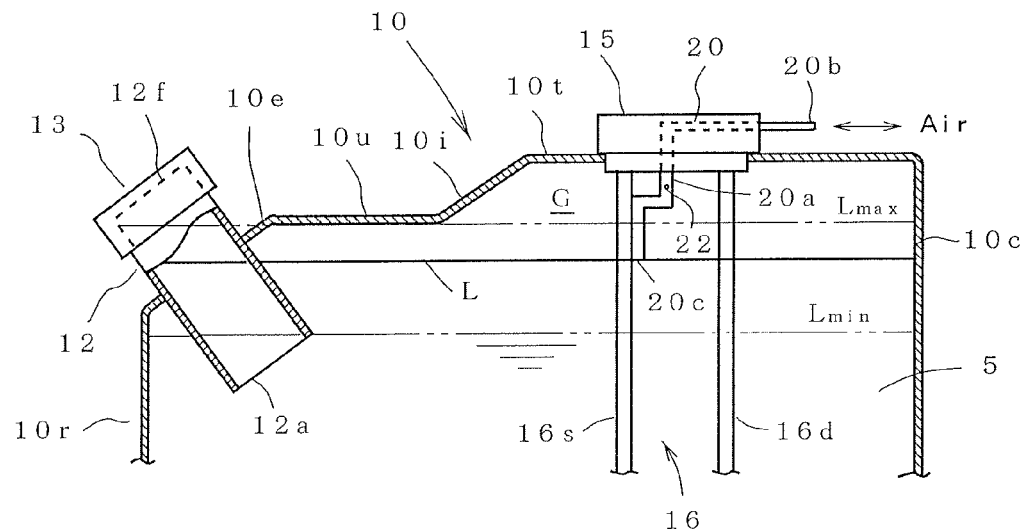
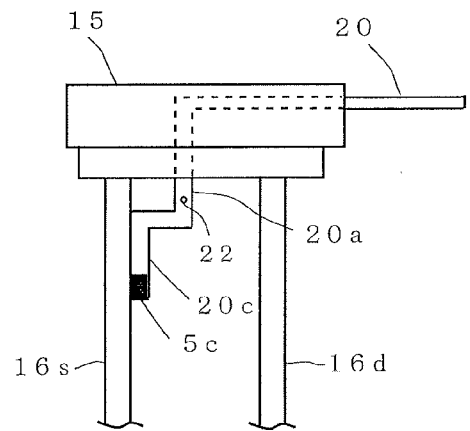
【FIG. 2】(a)
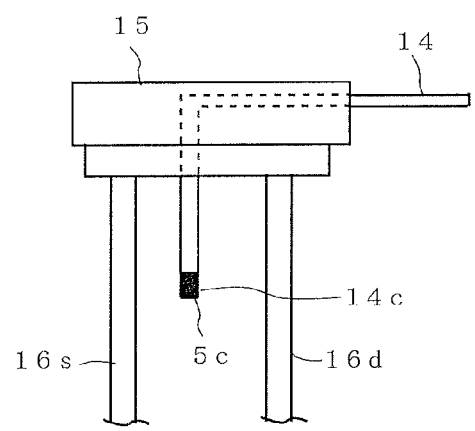
【FIG. 2】(b)
Prior Art

[FIG. 3]
Prior Art
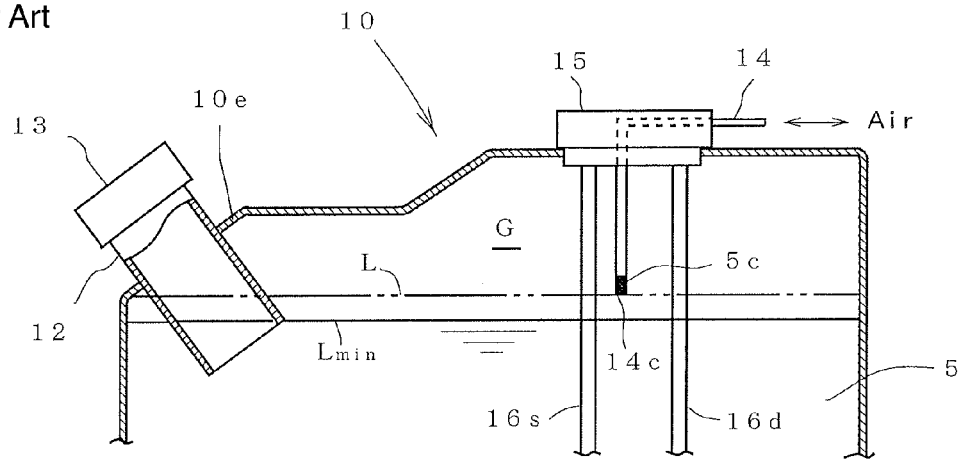
[FIG. 4]
Prior Art
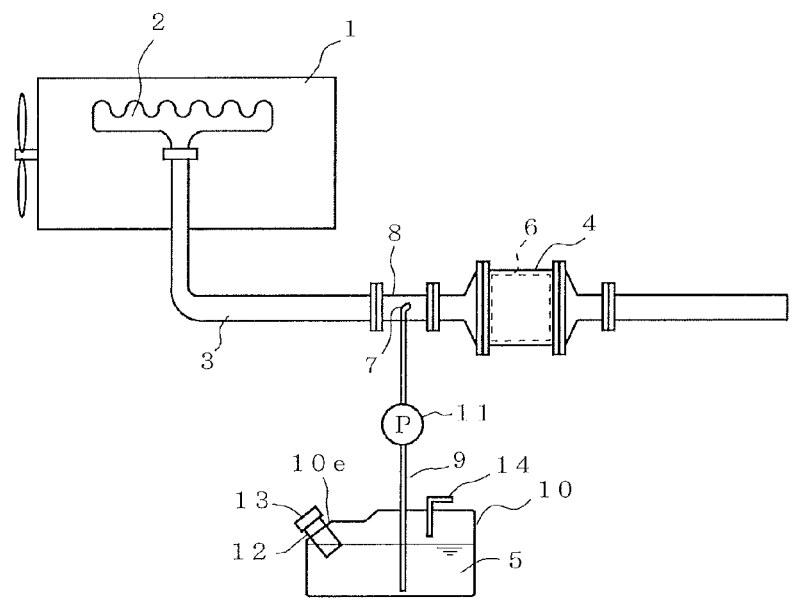

BREATHER PIPE STRUCTURE FOR LIQUID REDUCING AGENT STORAGE TANK

CROSS REFERENCE TO RELATED APPLICATIONS

This application is entitled to the benefit of and incorporates by reference essential subject matter disclosed in International Patent Application No. PCT/JP2011/053983 filed on Feb. 23, 2011 and Japanese Patent Application No. 2010-042744 filed Feb. 26, 2010.

TECHNICAL FIELD

This invention relates to a liquid reducing agent storage tank for storing a liquid reducing agent for reducing NOx in engine exhaust gas, and in particular to a breather pipe structure for a liquid reducing agent storage tank for introducing/discharging air according to an amount of liquid stored in the liquid reducing agent storage tank.

BACKGROUND ART

Exhaust gas purification systems which have been developed for purifying NOx in diesel engine exhaust gas include, for example, a urea SCR system using a selective catalytic reduction (SCR) (see, for example, Japanese Patent Application Laid-open No. 2000-27627 and Japanese Patent Application Laid-open No. 2005-83223).

This urea SCR system is configured to supply an aqueous urea solution (with a urea concentration of 32.5%), for example, serving as a liquid reducing agent to an upstream part in the direction of exhaust gas flow of the SCR device, so that urea is hydrolyzed to generate ammonia by heat of the exhaust gas, and NOx is reduced by this ammonia on a SCR catalyst.

As shown in FIG. 4, an exhaust pipe 3 is connected to an exhaust manifold 2 of a diesel engine 1. A SCR device 4 for NOx reduction is connected to the middle of the exhaust pipe 3, and a reducing agent supply pipe section 8 having an injection nozzle 7 for supplying a liquid reducing agent (urea aqueous solution) 5 to a SCR catalyst 6 in the SCR device 4 is connected to an upstream part in the direction of exhaust gas flow in the SCR device 4.

A liquid reducing agent storage tank 10 is connected to the injection nozzle 7 of the reducing agent supply pipe section 8 via a liquid reducing agent supply pipe 9. This liquid reducing agent storage tank 10 is configured to pressure feed the liquid reducing agent 5 from a liquid feeding pump 11 to the injection nozzle 7 via the liquid reducing agent supply pipe 9.

The liquid reducing agent storage tank 10 is provided with a filler pipe 12, so that the tank 10 is refilled with the liquid reducing agent 5 through the filler pipe 12 after removing a cap 13 provided on the filler pipe 12.

This liquid reducing agent storage tank 10 is installed in a small place on a side of a vehicle in the vicinity of the exhaust pipe 3, and the filler pipe 12 is attached to an upper edge 10e of the liquid reducing agent storage tank 10 on the vehicle side such that the filler pipe 12 is inclined obliquely upward to facilitate the injection of the liquid reducing agent 5.

Further, a breather pipe 14 is provided on top of the liquid reducing agent storage tank 10 in order to introduce air from the outside and to discharge air according to change of the liquid surface level in the tank.

DISCLOSURE OF THE INVENTION

In very cold climate, urea aqueous solution serving as the liquid reducing agent 5 will freeze at eleven degrees Celsius below zero. For this reason, as shown in FIG. 3, a pipe unit 15 on top of the liquid reducing agent storage tank 10 is provided with an engine coolant piping 16 formed into a U-shape or the like in order to defrost the liquid reducing agent 5 in the liquid reducing agent storage tank 10, so that the frozen liquid reducing agent 5 can be defrosted by feeding an engine coolant (LLC) from a supply-side engine coolant piping 16s to a discharge-side engine coolant piping 16d.

However, in this case, even though the liquid reducing agent 5 in the liquid reducing agent storage tank 10 can be defrosted, the liquid reducing agent 5c frozen in a lower end 14c of the breather pipe 14 as shown in FIG. 3 and FIG. 2(b) cannot be defrosted by the engine coolant piping 16, and the breather pipe 14 remains clogged with the frozen liquid reducing agent 5c. If a gas-phase region G in the liquid reducing agent storage tank 10 is hermetically sealed, the liquid feeding pump 11 of the SCR system becomes unable to suck the liquid reducing agent 5 and the liquid reducing agent 5 cannot be injected.

It is therefore an object the invention to solve the aforementioned problems, and to provide a breather pipe structure for a liquid reducing agent storage tank which does not obstruct the supply of a liquid reducing agent even if the breather pipe of the liquid reducing agent storage tank is clogged with frozen liquid reducing agent.

In order to achieve the object described above, this invention provides a breather pipe structure for a liquid reducing agent storage tank for storing a liquid reducing agent, having a breather pipe for introducing/discharging air attached on top of the liquid reducing agent storage tank, wherein a lower end of the breather pipe in the liquid reducing agent storage tank is arranged to extend along a liquid reducing agent defrosting piping provided in the liquid reducing agent storage tank.

In this invention, an air vent orifice may be provided in the breather pipe.

In this invention, a lower end of the breather pipe may be positioned between a liquid surface level at which a lower open end of the filler pipe is closed and a liquid surface level at which the liquid overflows from an inlet at the upper end of the filler pipe.

In this invention, the air vent orifice may be formed to have such a diameter that air in the liquid reducing agent storage tank will not be fushed out through the breather pipe during injection of the liquid reducing agent.

In this invention, the liquid reducing agent defrosting piping is constituted by an engine coolant piping for feeding an engine coolant.

According to this invention, the breather pipe is arranged along the liquid reducing agent defrosting piping provided in the liquid reducing agent storage tank, whereby even if any liquid reducing agent is frozen within the breather pipe, the frozen liquid reducing agent can be defrosted. Further, the breather pipe is provided with an air vent orifice, whereby even if the breather pipe is clogged with the frozen liquid reducing agent, the liquid reducing agent can be fed without difficulty. These are the advantageous effects offered by the invention.

BRIEF DESCRIPTION OF THE DRAWINGS

FIG. 1 is a cross-sectional view showing an embodiment of this invention.

FIG. 2 is an enlarged view showing a breather pipe according to the invention and a breather pipe according to prior art.

FIG. 3 is a diagram showing a conventional breather pipe structure for a liquid reducing agent storage tank.

FIG. 4 is a diagram illustrating a urea SCR system to which a liquid reducing agent storage tank is applied.

BEST MODE FOR CARRYING OUT THE INVENTION

A preferred embodiment of the invention will be described in detail with reference to the accompanying drawings.

FIG. 1 shows a breather pipe structure for a liquid reducing agent storage tank according to an embodiment of this invention.

Although omitted in FIG. 1, the liquid reducing agent storage tank 10 is provided with a liquid reducing agent supply pipe, and is configured, as described in relation to FIG. 4, to pressure-feed a liquid reducing agent 5 from a liquid feeding pump 11 to an injection nozzle 7 via a liquid reducing agent supply pipe 9 such that the liquid reducing agent 5 consisting of a urea aqueous solution (with a concentration of 32.5%) to upstream of the SCR device 4.

Although in FIG. 1 only an upper part of the liquid reducing agent storage tank 10 is shown with a lower part being omitted, a sidewall 10r on the left side as viewed in FIG. 1 is located on the right side (or on the left side) of a vehicle, while a sidewall 10c on the right side is located on a center side of the vehicle. The upper part of the liquid reducing agent storage tank 10 has a topwall 10t on its center side. An upper face portion 10u which is slightly lower than the topwall 10t is formed to extend from the topwall 10t toward the right side (or the left side) via an inclined portion 10i. A filler pipe 12 for injection of the liquid reducing agent 5 is provided at an upper edge 10e between the upper face portion 10u and the left-side sidewall 10r such that the filler pipe 12 is inclined obliquely upward by about 45 degrees, and a cap 13 is attached to close an inlet 12f of the filler pipe 12 by being screwed, for example.

A pipe unit 15 is provided on the topwall 10t of the liquid reducing agent storage tank 10, and the pipe unit 15 is provided with a liquid reducing agent defrosting piping for defrosting the frozen liquid reducing agent 5 in the liquid reducing agent storage tank 10. This liquid reducing agent defrosting piping is constituted by a piping having a heater provided therein, or by an engine coolant piping 16 formed into a U-shape, as shown in FIG. 1, so that the engine coolant passes therethrough. This engine coolant piping 16 is composed of a supply-side engine coolant piping 16s and a discharge-side engine coolant piping 16d. The engine coolant (LLC) is fed from the supply-side engine coolant piping 16s to heat the frozen liquid reducing agent 5 and discharged through the discharge-side engine coolant piping 16d.

The pipe unit 15 is provide with a breather pipe 20 for introducing and discharging air into and from a gas-phase region G in the liquid reducing agent storage tank 10. An end 20b of the breather pipe 20 that is located outside the liquid reducing agent storage tank 10 is open to the atmosphere, while a breather pipe section 20a located within the tank is bent so as to extend along the supply-side engine coolant piping 16s. The lower end 20c of the breather pipe section 20a within the tank is positioned at the same level as the liquid surface L when the tank is full.

The position of the lower end 20c of the breather pipe 20 is set to be equal to or higher than the liquid surface level $L_{min}$ where the lower open end 12a of the filler pipe 12 is closed, and to be equal to or lower than the liquid surface level $L_{max}$ where the liquid overflows from the inlet 12f at the upper end of the filler pipe 12, and this position of the lower end 20c is defined as the full-tank liquid surface L.

An air vent orifice 22 is further provided in the breather pipe section 20a above the full-tank liquid surface L. As shown in FIGS. 1 and 2(a), the air vent orifice 22 is provided in the breather pipe section 20a above the bend in the breather pipe 20. This air vent orifice 22 is formed to have such a diameter that air in the liquid reducing agent storage tank 10 will not be pushed out through the breather pipe 20 during injection of the liquid reducing agent 5.

Next, functions of the invention will be described.

When the urea SCR system is being operated by a SCR device during ordinary use thereof, the liquid reducing agent 5 is supplied to upstream of the SCR device, and the liquid surface level of the liquid reducing agent 5 in the liquid reducing agent storage tank 10 descends. Nevertheless, the pressure in the liquid reducing agent storage tank 10 is maintained at the atmospheric pressure since air is supplied into the gas-phase region G through the breather pipe 20.

When the lower end 20c of the breather pipe 20 is clogged with frozen liquid reducing agent 5c, as shown in FIG. 2 (a) during use of the SCR device in very cold climate, the frozen liquid reducing agent 5c can be quickly defrosted and the clog of the breather pipe 20 can be cleared by heat of the engine coolant flowing through the supply-side engine coolant piping 16s of the engine coolant piping 16, which makes it possible to introduce and discharge air through the breather pipe 20. Accordingly, the liquid reducing agent 5 can be supplied to the urea SCR system without any trouble that might be caused by the air in the liquid reducing agent storage tank 10 that cannot be released.

In contrast, in the case of the conventional breather pipe 14 shown in FIG. 2(b), when the lower end 14c thereof is clogged with frozen liquid reducing agent 5c, the engine coolant fed through the supply-side engine coolant piping 16s of the engine coolant piping 16 cannot defrost the frozen liquid reducing agent 5c in the lower end 14c of the breather pipe 14 even though it can defrost the liquid reducing agent 5 in the liquid reducing agent storage tank 10. As a result, the liquid reducing agent 5 cannot be supplied to the urea SCR system.

Further, in this invention, an air vent orifice 22 is provided in the breather pipe 20 at a position above the full-tank liquid surface L in preparation for an emergency until the clog in the breather pipe 20 is cleared, and this air vent orifice 22 has such a diameter that the air in the liquid reducing agent storage tank 10 is not pushed out through the breather pipe 20 when the liquid reducing agent is injected. This makes it possible to breathe through the air vent orifice 22 and to prevent hermetic sealing of the gas-phase region G. Thus, the SCR system is ensured to be able to suck the liquid reducing agent 5 in an emergency.

Further, since the air vent orifice 22 is formed to have such a diameter that the air in the liquid reducing agent storage tank 10 is not pushed out through the breather pipe 20, this air vent orifice 22 functions as resistance when the air in the gas-phase region G is discharged from the breather pipe 20 through the air vent orifice 22 when the liquid reducing agent 5 is injected from the filler pipe 12 and the liquid surface reaches the level of the lower end 20c of the breather pipe 20, that is, the full-tank liquid surface L. This makes it possible to control the position of the full-tank liquid surface L.

While the air vent orifice 22 functions as resistance during discharge of air and makes it possible to control the position of the full-tank liquid surface L, it is possible to breathe through the air vent orifice 22. Therefore, the liquid reducing agent 5 can be injected into the tank 10 until the liquid surface reaches the full-tank liquid surface L even if the breather pipe 20 is clogged with frozen liquid reducing agent 5*c*. In this case, the liquid reducing agent 5 can be injected gradually from the filler pipe 12 after the liquid surface reaches the liquid surface level $L_{min}$ where the lower end of the filler pipe 12 is closed, so that the air can be discharged through the air vent orifice 22 to enable the liquid reducing agent 5 to be injected until its liquid surface level reaches the full-tank liquid surface L.

According to this invention as described above, the breather pipe 20 for introducing/discharging air in the liquid reducing agent storage tank 10 according to change of the surface level of the liquid reducing agent 5 in the tank is provided such that its lower end 20*c* extends along a liquid reducing agent defrosting piping such as the engine coolant piping 16. Thus, even if the liquid reducing agent 5*c* is frozen in the lower end 20*c* to clog the breather pipe 20, the frozen liquid reducing agent 5*c* can be defrosted. Since air can be introduced into the gas-phase region G from the breather pipe 20 via the air vent orifice 22 until the frozen liquid reducing agent 5*c* is defrosted, the urea SCR system is ensured to be able to suck the liquid reducing agent 5 for an emergency.

Although the invention above has been described in connection with preferred embodiments of the invention, it will be evident for a person skilled in the art that several modifications are conceivable without departing from the invention as defined by the following claims.

What is claimed is:

1. A system comprising:
   a liquid reducing agent storage tank which stores a liquid reducing agent; and
   a breather pipe for introducing/discharging air attached on top of the liquid reducing agent storage tank;
   wherein a liquid reducing agent defrosting piping is provided to defrost the liquid reducing agent in the liquid reducing agent storage tank;
   wherein an upper end of the breather pipe is located outside the liquid reducing agent storage tank and is open to the atmosphere;
   wherein the breather pipe extends from a top of the liquid reducing agent storage tank into the liquid reducing agent storage tank;
   wherein a lower end part of the breather pipe extends along the liquid reducing agent defrosting piping provided in the liquid reducing agent storage tank;
   wherein the breather pipe is provided with a bent portion which is bent above the lower end part of the breather pipe that extends along the liquid reducing agent defrosting piping;
   wherein the breather pipe is provided with an air vent orifice above the bent portion; and
   wherein the air vent orifice and the bent portion are provided in the breather pipe inside the liquid reducing agent storage tank and are positioned above a full-tank liquid surface of the liquid reducing agent stored in the liquid reducing agent storage tank.

2. The system according to claim 1, wherein the lower end of the breather pipe is positioned between a liquid surface level at which a lower open end of the filler pipe is closed and a liquid surface level at which the liquid overflows from an inlet at the upper end of the filler pipe.

3. The system according to claim 1, wherein the air vent orifice is formed to have such a diameter that air in the liquid reducing agent storage tank is not pushed out through the breather pipe during injection of the liquid reducing agent.

4. The system according to claim 1, wherein the liquid reducing agent defrosting piping is constituted by an engine coolant piping for feeding an engine coolant.

* * * * *